United States Patent [19]

Storck

[11] 4,270,833
[45] Jun. 2, 1981

[54] REINFORCED ELECTRICAL CONNECTOR JUNCTION MEANS

[75] Inventor: Glenn E. Storck, Long Valley, N.J.

[73] Assignee: Thomas & Betts Corporation, Raritan, N.J.

[21] Appl. No.: 42,535

[22] Filed: May 25, 1979

[51] Int. Cl.³ .......................... H02G 3/08; H01R 13/60
[52] U.S. Cl. ....................................... 339/121; 174/48; 174/50
[58] Field of Search .................... 174/48, 49, 50, 70 R; 339/121, 125

[56] References Cited

U.S. PATENT DOCUMENTS

| | | | |
|---|---|---|---|
| 3,047,650 | 7/1962 | Reiland | 174/49 |
| 3,335,214 | 8/1967 | Brotherhood | 174/48 |
| 3,597,523 | 8/1971 | Guritz | 174/48 |
| 3,756,447 | 9/1973 | Hadfield | 174/48 X |
| 3,934,072 | 1/1976 | Balde | 174/48 |
| 4,030,801 | 6/1977 | Bunnell | 339/121 |
| 4,088,827 | 5/1978 | Kohaut | 174/48 |

FOREIGN PATENT DOCUMENTS 1127430  4/1962  Fed. Rep. of Germany ............. 174/48

*Primary Examiner*—John McQuade
*Assistant Examiner*—John S. Brown
*Attorney, Agent, or Firm*—James J. Daley; Robert M. Rodrick; Jesse Woldman

[57] ABSTRACT

A reinforced electrical connector junction means for flat conductor cable lying along a floor. The electrical connector junction means includes a base having a substantially flat support surface for mounting of the base on the floor adjacent a flat conductor cable and a housing for the base having an upper wall and depending side walls defining an interior space above the base for receiving the flat conductor cable and a second conductor for electrical connection together. An upstanding reinforcing supporting member is affixed to the base and extends upwardly thereabove. The reinforcing supporting member includes an upper supporting surface for supporting the upper wall of the housing when the housing is positioned over the base and the supporting member. In this way, vertical loads applied to the housing, such as by a person standing on the installed junction means, will not adversely affect the integrity of the junction means and/or the electrical connection of the second conductor with the flat conductor cable.

7 Claims, 3 Drawing Figures

REINFORCED ELECTRICAL CONNECTOR JUNCTION MEANS

BACKGROUND OF THE INVENTION

The present invention relates to an electrical connector junction means, and more particularly to electrical connector junction means for use with flat conductor cables lying along a floor.

Flat conductor cable was developed to replace present electrical systems or installations utilizing conduits buried in the floor or above the ceiling. The flat cables are intended to be placed flush to the floor surface with the necessary branch circuits leading to the desired locations, and with carpeting then placed over the cable to provide a surface suitable for interior use and for personnel traffic. With such a system, it is necessary to provide for an electrical connection junction means secured to the floor at various locations and within which electrical connection of the flat conductors is made with other more conventional conductors which are connected in a conventional manner to telephones and/or other electrical equipment.

In the prior art, flat conductor cables have been used for telecommunications equipment in which it has been generally necessary to use conventional coupling devices for terminating the flat conductor cable and which are adapted to mate with other suitable coupling devices secured to other conductors, such as for example conventional round wire conductors. The second conventional round wire conductors are then connected to the telephones and/or other equipment. Examples of such prior art electrical connector junction devices are shown in U.S. Pat. No. 3,934,072 entitled "Apparatus and Method for Terminating Lines Running Under Flexible Floor Covering" and U.S. Pat. No. 4,030,801 entitled "Electrical Connector Junction For Carpeted Floor". Each of these patents discloses systems of mounting and housing standard telecommunication connector systems attached to a flat conductor cable and connected to more conventional round wire conductors. However, these junction devices have not provided means for accommodating vertically applied loads, such as for example from a person standing on the installed bracket and housing. After installation of the mounting bracket and housing to the floor and installation of the coupling devices or connectors to the bracket, a vertically applied force could be transferred to the connectors by the bracket ends which may bend in towards the center of the bracket as the load is increased. Such a force may be of a magnitude sufficient to cause mechanical failure of the connectors. Additionally, such prior art arrangements also usually require that a temporary cover be placed over the mounting bracket prior to carpet installation in order to provide mechanical protection for the flat conductor cable and the connectors during cutting of the carpet placed over the cable and connectors to expose the bracket/connectors for final termination.

SUMMARY OF THE INVENTION

There is provided in accordance with the present invention a reinforced electrical connector junction means for use with flat conductor cable lying along a floor. The electrical connector junction means comprises a base having a substantially flat supporting surface for mounting of the base on a floor adjacent a flat conductor cable, and a housing for the base having an upper wall and depending side walls defining an interior space above the base for receiving the flat conductor cable and second conductors for electrical connection together. An upstanding reinforcing supporting member is affixed to and extends upwardly above the base. The reinforcing supporting member includes an upper supporting surface for supporting the upper wall of the housing when the housing is positioned over the base and the support member to thereby provide structural strength for the connector junction means to accomodate vertical loads applied thereto, such as for example by a person standing of the connector junction means. This structural strength of the reinforcing supporting member and its protection of the connector junction means is present regardless of whether the housing is present or not.

In the preferred embodiment, a spacer member is interposed between the upper wall of the housing and the upper surface of the supporting member to properly position the side walls of the housing relative to the floor. In this way, the housing will be supported by the supporting member and not by the depending side walls. In a still further preferred embodiment, the upstanding reinforcing member comprises a longitudinally extending rib and a pair of laterally extending arms interconnected thereto to define a compartment within the interior space of the housing for providing mechanical protection and support for an electrical connection coupling device for making electrical connection between the flat conductor cable and the second conductors received within the housing.

These and other features and characteristics of the present invention will be apparent from the following detailed description in which reference is made to the enclosed drawings which illustrate a preferred embodiment of the present invention.

DETAILED DESCRIPTION OF THE PREFERRED EMBODIMENT

Figure 1:
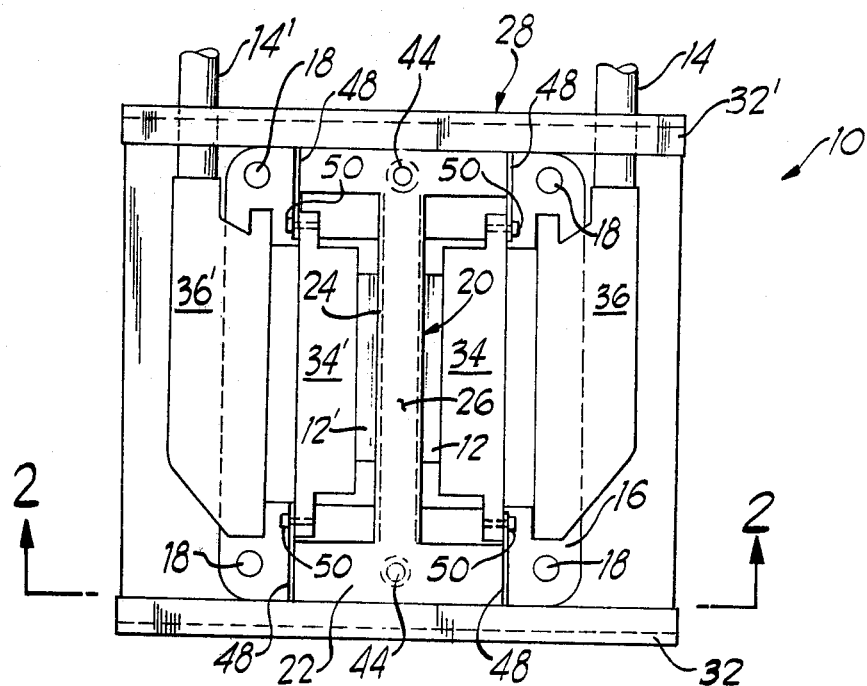
FIG. 1 is a sectional plan view of the electrical connection junction means in accordance with the present invention showing the major components thereof and illustrating the mounting of the connector coupling devices for making electrical connection between the flat conductor cable and second conductor cable.
Figure 2:
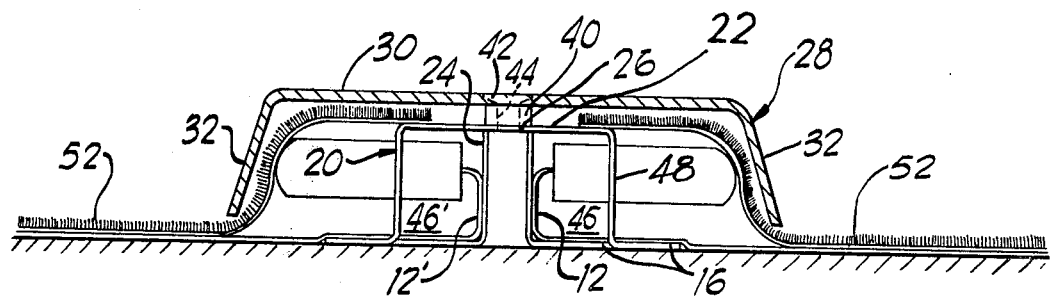
FIG. 2 is a side sectional view of the electrical connection junction means in accordance with the present invention, taken along lines 2—2 of FIG. 1.

Referring now to the drawings in which like reference characters represent like elements, there is shown in FIGS. 1 and 2 an electrical connector junction means 10 in accordance with the present invention which is particularly useful within which to make an electrical connection of a flat conductor cable with more conventional second conductor cables. In the particular embodiment shown, the electrical connector junction means 10 is adapted for providing electrical connection between a pair of flat conductor cables 12, 12' and a respective pair of round conductor cables 14, 14' for telecommunication systems. However, it will be apparent to those skilled in the art that the electrical connector junction means 10 of the present invention may also be used with power distribution flat conductor cable systems, such as for example the system disclosed in U.S. Pat. Application Ser. No. 42,709 entitled "Electric Cable Assembly and Method of Folding Same" and filed on May 25, 1979, or for combinations of such power distribution systems and telecommunication systems.

The electrical connector junction means 10 includes a substantially flat base portion 16 fabricated, in the preferred embodiment, of sheet metal. However, other materials could be used, such as for example a plastic material suitable for molding. The base portion 16 is adapted to be placed flush to the floor surface adjacent the flat conductor cables 12, 12' and secured thereinplace with the use of suitable mechanical fasteners (not shown) which are adapted to pass through mounting holes 18 provided in the corners of the base portion 16. Alternatively, the base portion 16 could be secured to the floor by gluing the lower surface thereof directly to the floor.

An upstanding support member or bracket 20 is integrally affixed to the base portion 16 and extends upwardly thereabove. In the preferred embodiment, the upstanding support bracket 20 is comprised of a pair of spaced laterally extending side members or arms 22 interconnected by a longitudinally extending center web reinforcing or rib 24. The bracket side arms 22 and the central reinforcing rib 24 extend upwardly a substantial distance above the flat base 16 to provide an upper supporting surface 26 of a general H-shaped configuration for supporting the upper wall of a housing or cover, to be described more fully hereinbelow.

In the preferred embodiment, the base 16 and the upstanding support bracket 20 are both integral with one another, having been formed from a single piece of sheet metal cut and bent into the configuration shown. However, the support bracket 20 could be formed separately from the base portion 16, and further could be formed from a different material such as plastic suitable for molding.

Figure 3:
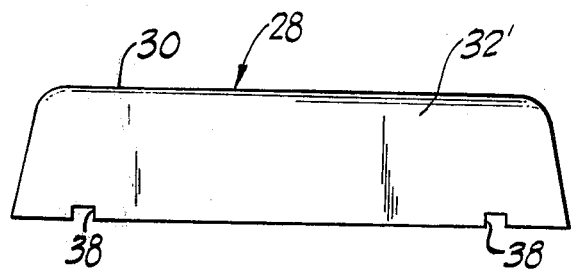
FIG. 3 is a side elevational view of one of the side walls of the housing in accordance with the present invention.

The cover or housing 28 includes a substantially flat rectangular shaped upper wall 30 with four depending sides 32 to thus define an interior space within which the conductor cables 12, 12' and connectors 34, 34', 36, 36' are received when the housing 28 is supported by the upstanding bracket 20. It will be noted that one of the side walls 32' (see FIG. 3) is provided with a pair of rectangular cutouts 38 through which a pair of rectangular conductor cables may enter the hollowed out interior of the housing 28 for attachment to a pair of cable connectors 36, 36'. The areas about the cutouts 38 are connected to the main part of the housing 28 by thin webs only visible from within the housing 28. Thus, if any cable larger than the rectangular cable, i.e., round conductor cables 14, 14' is to enter the housing 28, the area about the cutout 38 is gripped by a suitable tool and the web is broken to expose a larger properly contoured entrance to the interior of the housing 28. A spacer member or spacer block 40 is interposed between the upper wall 30 of the housing 28 and the upper surface 26 of the supporting bracket 20 so that the bracket 20 will serve to support the upper wall 30 of the housing 28, and thus the housing 28, relative to the surface of the floor. In the preferred embodiment, this spacer block 40 is of an elongated rectangular configuration for engaging the upper surface 26 of the longitudinally extending rib 24 of the supporting bracket 20 and is integral with the upper wall 30 of the housing 28. In this way, the vertical dimensions of the upstanding bracket 20 may be uniform. The height of the housing 28 can be varied by varying the height of the spacer block 40 so that the housing 28 will be substantially supported by the upstanding bracket 20 with the lower edges of the side walls 32 being slightly spaced above the surface of the floor. The housing 28 is secured to the bracket 20 by means of mounting screws (not shown) passing through suitable openings 42 (shown in phantom line in FIG. 2) in the housing 28 and into threaded recesses 44 provided on the upper surface 26 of the bracket 20 at the bracketed side arms 22. Any other suitable arrangement such as a Tinnerman sheet metal nut and a sheet metal screw can be used, if desired.

The bracket side arms 22 and the central longitudinally extending rib 24 together define a pair of compartments 46, 46' for housing and supporting the conventional electrical coupling devices 34, 34', 36, 36' for making electrical connection between the flat conductor cables 12, 12' and the more conventional round conductor cables 14, 14'. Each of the bracket side arms 22 include a pair of rib portions 48 at their lateral ends which extend longitudinally towards the other bracket side arms 22 to provide a suitable mounting surface for mounting a conventional mating connector coupling device attached to one of the conductor cables 12, 12', 14, 14'. This can best be seen in FIG. 1 wherein each connector coupling device 34, 34' secured to the flat conductor cable 12, 12' is mounted by means of screws 50 to the opposing rib portion 48 of the two side arms 22. The mating connector coupling devices 36, 36' for the round telephone conductor cable 14, 14' are adapted to be matingly connected to the flat cable connector coupling devices 34, 34' as is conventional. In this way, the two pair of mating connector coupling devices 34, 36 and 34', 36' are rigidly supported by the longitudinally extending ribs 48 of the bracket side arms 22 and spaced above the base portion 16. Thus, the flat conductor cables 12, 12' may then be fed beneath their respective mating pair of coupling devices 34, 36 or 34', 36' over the base portion 16, upwardly adjacent the upstanding central rib 24, and secured in a conventional manner to the flat cable connector devices 34, 34'. It should be noted that the upper surface 26 of the central rib 24 as well as the upper surface of the side arms 22 is located above the upper surfaces of the mating connectors 34, 36 (see FIG. 2) so that the upper wall 30 of the housing 28 will not interfere with and touch the connector coupling devices 34, 34', 36, 36'.

With such an arrangement in which the housing 28 is supported by the upstanding reinforcing member 20 extending above the base 16, any vertical loads applied to the installed electrical connection junction means 10, such as by a person standing on the housing 28, will be prevented from being transferred to the mounted connector coupling devices 34, 36 and instead will be absorbed or taken up by the upstanding reinforcing bracket member 20. In this way, the integrity of the electrical connection between the flat conductor cable 12, 12' and the second conductor cable 14, 14' will be maintained and ensured. Further, it should be noted that such an upstanding bracket member 20 having a pair of side arms 22 and a central interconnecting rib 24 serves to provide nesting or semienclosed mounting chambers 46, 46' for the pair of telephone connector coupling devices 34, 34', to provide additional protection from impact loads.

In installing the electrical connector junction means 10 in accordance with the present invention, the base portion 16 is first secured to the floor adjacent the flat conductor cable 12, either by means of mounting screws received within mounting holes 18 or with a suitable adhesive applied to the underside of the base portion 16. Flat conductor cable 12 is then fed over the upper surface of the base portion 16 and secured to a suitable connector coupling device 34 which in turn is secured, though the use of mounting screws 50 to the longitudinally extending rib 48 of the bracket side arms 22.

Carpeting 52 may then be laid over the floor surface covering the flat conductor cable 12 (or cables) as well as over the base portion 16 and bracket 20. Then, using the center support rib 24 and the bracket side arms 22 as guides for knife blades, a H-type shaped cut may be made in the carpet 52 to expose the connector coupling devices 34, 36, the support bracket 20 and base portion 16. The carpeting 52 may then be secured to the floor surface and the excess carpeting may then be removed or allowed to remain on top of the connector coupling devices 34, 34', 36, 36'. Preferably, at least some of the carpeting 52 which has been cut around the base 16/bracket member 20 is allowed to remain. Mating connector coupling devices 36, 36' secured to conventional telephone round cable 14, 14' may then be matingly connected in a conventional manner to the flat conductor connector coupling devices 34, 34' secured to the support bracket 20. The housing 28 may then be secured to the supporting bracket 20 by means of screws so that the edge of the carpeting 52 which has been cut extends into the interior space above the connector coupling devices 34, 34', 36, 36' (see FIG. 2) to complete installation.

It is to be noted that during this cutting operation and laying of the carpet 52, no temporary cover is necessary as the central supporting ribs 24 acts as a guide for the knife blade to provide mechanical protection for the cables 12, 12' and the connector coupling devices 34, 34'. As can be appreciated, this results in a savings in material cost, as well as labor cost in installing the electrical connector junction means 10, since the intermediate step of installing the temporary cover and then removing same after the carpet has been installed can be eliminated.

Although in the embodiment shown the flat conductor cables 12, 12' is fed over the base portion 16 between the depending side walls 32 of the housing 28 and the outer edge of the base portion 16, the base portion 16 could be laid over the conductor cables 12, 12' and an opening provided in the base for feeding the flat conductor cable 12 upwardly above the base 16 for suitable securement to a coupling device and/or mounting surface. Such an arrangement for the base plate for example is disclosed in copending U.S. Patent Application Ser. No. 42,370 entitled "Flat Conductor Cable Electrical Conductor Junction Means" filed on May 25, 1979.

Thus, it is seen that in accordance with the present invention, there is provided an electrical connector junction means 10 which is capable of accommodating vertical loads applied thereto after installation, such as for example as might be experienced if a person stood on the connector junction means after installation. The upstanding reinforcing supporting member 20 provides mechanical strength and protection to maintain the integrity of the electrical connection therewithin.

While the preferred embodiment of the present invention has been shown and described, it will be understood that such are merely illustrative and that changes may be made without departing from the scope of the invention as claimed.

What is claimed is:

1. Electrical connector junction means for use with flat conductor cable lying along a floor, said electrical connector junction means comprising:
    a base having a substantially flat support surface for mounting of said base on a floor adjacent a flat conductor cable;
    a housing for said base, said housing having an upper wall and depending side walls defining an interior space above said base for receiving the flat conductor cable and a second conductor for electrical connection together; and
    a central upstanding reinforcing supporting member affixed to and extending upwardly above the center of said base, said reinforcing supporting member comprising a longitudinally extending rib and a pair of spaced laterally extending arms interconnected by said longitudinally extending rib for supporting said upper wall of said housing when said housing is positioned over said base and said supporting member.

2. The electrical connector junction means of claim 1 further including a spacer member interposed between an upper surface of said supporting member and said upper wall of said housing.

3. The electrical connector junction means of claim 1 wherein said laterally extending arms are centrally positioned above said base and with said longitudinally extending rib define first and second compartments within said interior space of said housing when said housing is supported by said upper supporting surface.

4. The electrical connector junction means of claim 1 wherein said supporting member further includes a mounting surface for mounting of an electrical connection coupling device connected to one of the conductor cables received within said housing.

5. The electrical connector junction means of claim 4 wherein said mounting surface comprises a pair of rib portions extending longitudinally from opposing portions of said laterally extending arms.

6. The electrical connector junction means of claim 1 further including means for securing said housing to said supporting member.

7. The electrical connector junction means of claim 6 wherein said means for securing comprises recesses in an upper surface of said supporting member for receiving fastening members extending through said upper wall of said housing.

* * * * *